(12) United States Patent
Subramanian et al.

(10) Patent No.: US 10,523,779 B2
(45) Date of Patent: Dec. 31, 2019

(54) METHOD AND SYSTEM TO PRE-FETCH DATA IN A NETWORK

(71) Applicant: PayPal, Inc., San Jose, CA (US)

(72) Inventors: Mahesh Subramanian, San Jose, CA (US); William Orcutt, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 328 days.

(21) Appl. No.: 14/231,490

(22) Filed: Mar. 31, 2014

(65) Prior Publication Data

US 2014/0215013 A1 Jul. 31, 2014

Related U.S. Application Data

(63) Continuation of application No. 14/011,968, filed on Aug. 28, 2013, now Pat. No. 9,219,792, which is a
(Continued)

(51) Int. Cl.
*H04L 29/06* (2006.01)
*H04L 29/08* (2006.01)
*G06F 16/172* (2019.01)

(52) U.S. Cl.
CPC ........ *H04L 67/2847* (2013.01); *G06F 16/172* (2019.01); *H04L 29/06047* (2013.01); *H04L 65/4007* (2013.01); *H04L 67/42* (2013.01)

(58) Field of Classification Search
CPC ......... G06F 17/30902; G06F 17/30132; G06F 12/0862; G06F 8/4442; G06F 9/30047;
(Continued)

(56) References Cited

U.S. PATENT DOCUMENTS

| | | | | |
|---|---|---|---|---|
| 4,953,209 A | * | 8/1990 | Ryder, Sr. | ............. G06F 21/126 705/55 |
| 5,727,129 A | * | 3/1998 | Barrett | ............. G06F 17/30902 704/270.1 |

(Continued)

OTHER PUBLICATIONS

"U.S. Appl. No. 11/359,859, Non-Final Office Action dated Apr. 3, 2009", 9 pgs.

(Continued)

*Primary Examiner* — Vivek Srivastava
*Assistant Examiner* — Muhammad Raza
(74) *Attorney, Agent, or Firm* — Maschoff Brennan

(57) ABSTRACT

A system, a computer readable storage medium including instructions, and a computer-implemented method of pre-fetching in a network, are provided. In an example embodiment, computer-implemented method of pre-fetching in a network comprises receiving a request from a user device for a first network-accessible data item in the plurality of network-accessible data items; transmitting the first network-accessible data item to the user device; identifying a second network-accessible data item in the plurality of network-accessible data items; and transmitting the second network-accessible data item to the user device, the second network-accessible data item being transmitted before receiving a request for the second network-accessible data item from the user device. Pre-fetch logic may be embedded in the first network-accessible data item.

12 Claims, 7 Drawing Sheets

FLOW CHART SHOWING THE TYPICAL FLOW AND THE OPTIMIZED FLOW

Related U.S. Application Data continuation of application No. 13/430,029, filed on Mar. 26, 2012, now Pat. No. 8,547,383, which is a continuation of application No. 13/019,847, filed on Feb. 2, 2011, now Pat. No. 8,169,443, which is a continuation of application No. 12/635,626, filed on Dec. 10, 2009, now Pat. No. 7,884,827, which is a continuation of application No. 11/359,859, filed on Feb. 22, 2006, now Pat. No. 7,659,905.

(58) Field of Classification Search
CPC ............. G06F 9/3802; G06F 2212/602; G06F 2212/6022; G06F 2212/6024; G06F 2212/6026; G06F 2212/6028; G06F 2216/13; G06F 9/3814; G06F 9/383; G06F 16/9574; G06F 16/172; H04L 67/2847; H04L 29/0881; H04L 69/329; H04L 29/06; H04L 65/4007; H04L 29/06047; H04L 67/42

See application file for complete search history.

(56) References Cited

U.S. PATENT DOCUMENTS

| | | | |
|---|---|---|---|
| 5,802,292 A * | 9/1998 | Mogul | G06F 17/30902 707/E17.12 |
| 5,878,223 A * | 3/1999 | Becker | G06F 17/30902 707/E17.12 |
| 6,016,520 A | 1/2000 | Facq et al. | |
| 6,067,565 A * | 5/2000 | Horvitz | G06F 17/30861 707/E17.107 |
| 6,085,226 A | 7/2000 | Horvitz | |
| 6,199,107 B1 * | 3/2001 | Dujari | G06F 17/30902 707/E17.12 |
| 6,349,410 B1 | 2/2002 | Lortz | |
| 6,385,641 B1 * | 5/2002 | Jiang | H04L 29/06 709/203 |
| 6,633,316 B1 | 10/2003 | Maddalozzo et al. | |
| 6,757,712 B1 | 6/2004 | Bastian et al. | |
| 6,772,193 B1 | 8/2004 | Igawa et al. | |
| 7,047,485 B1 * | 5/2006 | Klein | G06F 17/30902 707/E17.12 |
| 7,062,756 B2 | 6/2006 | Kamen et al. | |
| 7,130,890 B1 * | 10/2006 | Kumar | H04L 67/2847 709/218 |
| 7,158,986 B1 | 1/2007 | Oliver et al. | |
| 7,343,396 B2 | 3/2008 | Kausik et al. | |
| 7,343,397 B2 | 3/2008 | Kochanski | |
| 7,389,330 B2 | 6/2008 | Dillon et al. | |
| 7,493,450 B2 | 2/2009 | Bearden | |
| 7,500,063 B2 | 3/2009 | Zohar et al. | |
| 7,659,905 B2 | 2/2010 | Mahesh et al. | |
| 7,797,376 B1 * | 9/2010 | Desai | H04L 67/2847 709/203 |
| 7,827,055 B1 | 11/2010 | Snodgrass et al. | |
| 7,827,186 B2 | 11/2010 | Hicks | |
| 7,884,827 B2 | 2/2011 | Mahesh et al. | |
| 7,890,856 B2 | 2/2011 | Chiang | |
| 8,169,443 B2 | 5/2012 | Subramanian et al. | |
| 8,547,383 B2 | 10/2013 | Subramanian | |
| 8,601,475 B2 | 12/2013 | Landsman | |
| 9,219,792 B2 | 12/2015 | Subramanian et al. | |
| 2002/0055966 A1 * | 5/2002 | Border | H04L 29/06 709/200 |
| 2002/0078165 A1 * | 6/2002 | Genty | G06F 17/30902 709/217 |
| 2003/0115420 A1 * | 6/2003 | Tsirigotis | G06F 16/9574 711/133 |
| 2003/0195940 A1 * | 10/2003 | Basu | G06F 16/9574 709/213 |
| 2004/0068579 A1 * | 4/2004 | Marmigere | H04L 29/06 709/242 |
| 2005/0097008 A1 * | 5/2005 | Ehring | G06F 17/211 715/205 |
| 2005/0154781 A1 * | 7/2005 | Carlson | G06F 16/9574 709/203 |
| 2005/0198191 A1 | 9/2005 | Carlson et al. | |
| 2006/0253546 A1 * | 11/2006 | Chang | G06F 17/30902 709/217 |
| 2007/0033588 A1 | 2/2007 | Landsman | |
| 2007/0216674 A1 | 9/2007 | Subramanian et al. | |
| 2010/0095226 A1 | 4/2010 | Subramanian et al. | |
| 2011/0125871 A1 | 5/2011 | Subramanian et al. | |
| 2012/0185565 A1 | 7/2012 | Subramanian | |
| 2013/0346490 A1 | 12/2013 | Subramanian et al. | |
| 2014/0214928 A1 | 7/2014 | Subramanian et al. | |
| 2014/0215014 A1 | 7/2014 | Subramanian et al. | |

OTHER PUBLICATIONS

"U.S. Appl. No. 11/359,859, Non-Final Office Action dated Sep. 23, 2008", 9 pgs.

"U.S. Appl. No. 11/359,859, Notice of Allowance dated Sep. 18, 2009", 4 pgs.

"U.S. Appl. No. 11/359,859, Response filed Jul. 24, 2009 to Non Final Office Action dated Apr. 3, 2009", 13 pgs.

"U.S. Appl. No. 11/359,859, Response filed Dec. 22, 2008 to Non Final Office Action dated Sep. 23, 2008", 13 pgs.

"U.S. Appl. No. 12/635,626, Non-Final Office Action dated Jun. 9, 2010", 6 pgs.

"U.S. Appl. No. 12/635,626, Notice of Allowance dated Sep. 28, 2010", 4 pgs.

"U.S. Appl. No. 12/635,626, Response filed Sep. 9, 2010 to Non Final Office Action dated Jun. 9, 2010", 13 pgs.

"U.S. Appl. No. 13/019,847, Final Office Action dated Nov. 25, 2011", 8 pgs.

"U.S. Appl. No. 13/019,847, Non Final Office Action dated Aug. 2, 2011", 7 pgs.

"U.S. Appl. No. 13/019,847, Notice of Allowance dated Feb. 2, 2012", 7 pgs.

"U.S. Appl. No. 13/019,847, Response filed Jan. 12, 2012 to Final Office Action dated Nov. 25, 2011", 12 pgs.

"U.S. Appl. No. 13/019,847, Response filed Aug. 25, 2011 to Final Office Action dated Aug. 2, 2011", 17 pgs.

"U.S. Appl. No. 13/430,029, Non Final Office Action dated Nov. 8, 2012", 11 pgs.

"U.S. Appl. No. 13/430,029, Notice of Allowance dated May 29, 2013", 6 pgs.

"U.S. Appl. No. 13/430,029, Response filed Apr. 8, 2013 to Non Final Office Action dated Nov. 8, 2012", 13 pgs.

"U.S. Appl. No. 14/011,968, Non Final Office Action dated Mar. 3, 2015", 10 pgs.

"U.S. Appl. No. 14/011,968, Notice of Allowance dated Jul. 17, 2015", 8 pgs.

"U.S. Appl. No. 14/011,968, Preliminary Amendment filed Nov. 7, 2013", 6 pgs.

"U.S. Appl. No. 14/011,968, Response filed Jul. 3, 2015 to Non Final Office Action dated Mar. 3, 2015", 10 pgs.

"U.S. Appl. No. 14/231,494, Preliminary Amendment filed Apr. 15, 2014", 7 pgs.

"U.S. Appl. No. 14/231,504, Non Final Office Action dated Feb. 12, 2015", 18 pgs.

"U.S. Appl. No. 14/231,504, Preliminary Amendment filed Apr. 15, 2014", 7 pgs.

"U.S. Appl. No. 14/231,504, Response filed Jul. 13, 2015 to Non Final Office Action dated Feb. 12, 2015", 17 pgs.

Cohen, Edith, et al., "Efficient Algorithms for Predicting Requests to Web Servers", AT&T Lab Research, (1999), 10 pgs.

Teng, W., et al., "Integrating Web caching and Web prefetching in client-side proxies", IEEE Transactions on Parallel and Distributed Systems, 16(5), (2005), 444-455.

Wang, Jia, "A Survey of Web Caching Schemes for the Internet", Cornell University, (1999), 11 pgs.

Wang, Z., et al., "Prefetching in World Wide Web", Global Telecommunications Conference, 1996. GLOBECOM '96. 'Communications: The Key to Global Prosperity, (1996), 28-32.

(56) References Cited

OTHER PUBLICATIONS

"U.S. Appl. No. 14/011,968, Corrected Notice of Allowance dated Nov. 17, 2015", 2 pgs.
"U.S. Appl. No. 14/231,494, Non Final Office Action dated Oct. 22, 2015", 20 pgs.
"U.S. Appl. No. 14/231,504, Final Office Action dated Nov. 6, 2015", 17 pgs.
"U.S. Appl. No. 14/231,504, Response filed Feb. 8, 2016 to Final Office Action dated Nov. 6, 2015", 15 pgs.

* cited by examiner

FLOW CHART SHOWING THE TYPICAL FLOW AND THE OPTIMIZED FLOW

METHOD AND SYSTEM TO PRE-FETCH DATA IN A NETWORK

CROSS-REFERENCE TO RELATED APPLICATIONS

This application is a continuation of U.S. application Ser. No. 14/011,968, filed Aug. 28, 2013, which is a continuation of U.S. application Ser. No. 13/430,029, filed Mar. 26, 2012, which is a continuation of U.S. application Ser. No. 13/019,847, filed Feb. 2, 2011, which is a continuation of U.S. application Ser. No. 12/635,626, filed Dec. 10, 2009, which is a continuation of U.S. application Ser. No. 11/359,859, filed Feb. 22, 2006, which applications are incorporated herein in their entirety by reference.

BACKGROUND

There are many situations in which a network user (e.g., a person accessing the Internet) may desire to communicate (e.g. download or otherwise receive) a relatively large amount of data via the network from another client computer or a server computer.

For example, consider that electronic commerce utilizes the Internet to sell goods and services to customers, and has been increasing in its scope and scale at increasing rates. A seller will typically list an item for sale or auction by inputting information regarding the item for sale into a plurality of information fields using a remote user input device, for example a user computer. The computer is connected to a communications network such as the Internet and when the user has completed inputting the information, data is transmitted to a central server to create the listing.

A potential buyer accesses the central server using a remote user input device, for example a user computer typically via the Internet, and views the listing and perhaps makes an offer to purchase the listing.

In order to do this both the seller and the buyer typically navigate through a series of web pages over the Internet.

However, where the amount of data to be transmitted to the user computer is large, it will be appreciated that the user will wait for some time while the data is transmitted over the network and they receive the data and are able to view it, typically using a web browser. This is particularly exaggerated for dial-up and low broadband users.

Of course, the above is just one example environment in which a user may desire to receive data via a network (e.g. the Internet). Photo hosting sites on the Internet have been increasing in popularity, and require users to download multiple digital photographs from a server to view these digital photographs and to order physical prints of the digital photographs.

Other examples of relatively large digital files that a user may wish to download over a network include audio and video files. For example, a user may wish to download an MPEG video from a web site for archiving and availability to other users. Similarly, certain web sites may act as distribution channels for up-and-coming musical artists, and may accordingly allow for the downloading of MP3 files from a web site (e.g., www.MP3.com).

DETAILED DESCRIPTION

Figure 1:
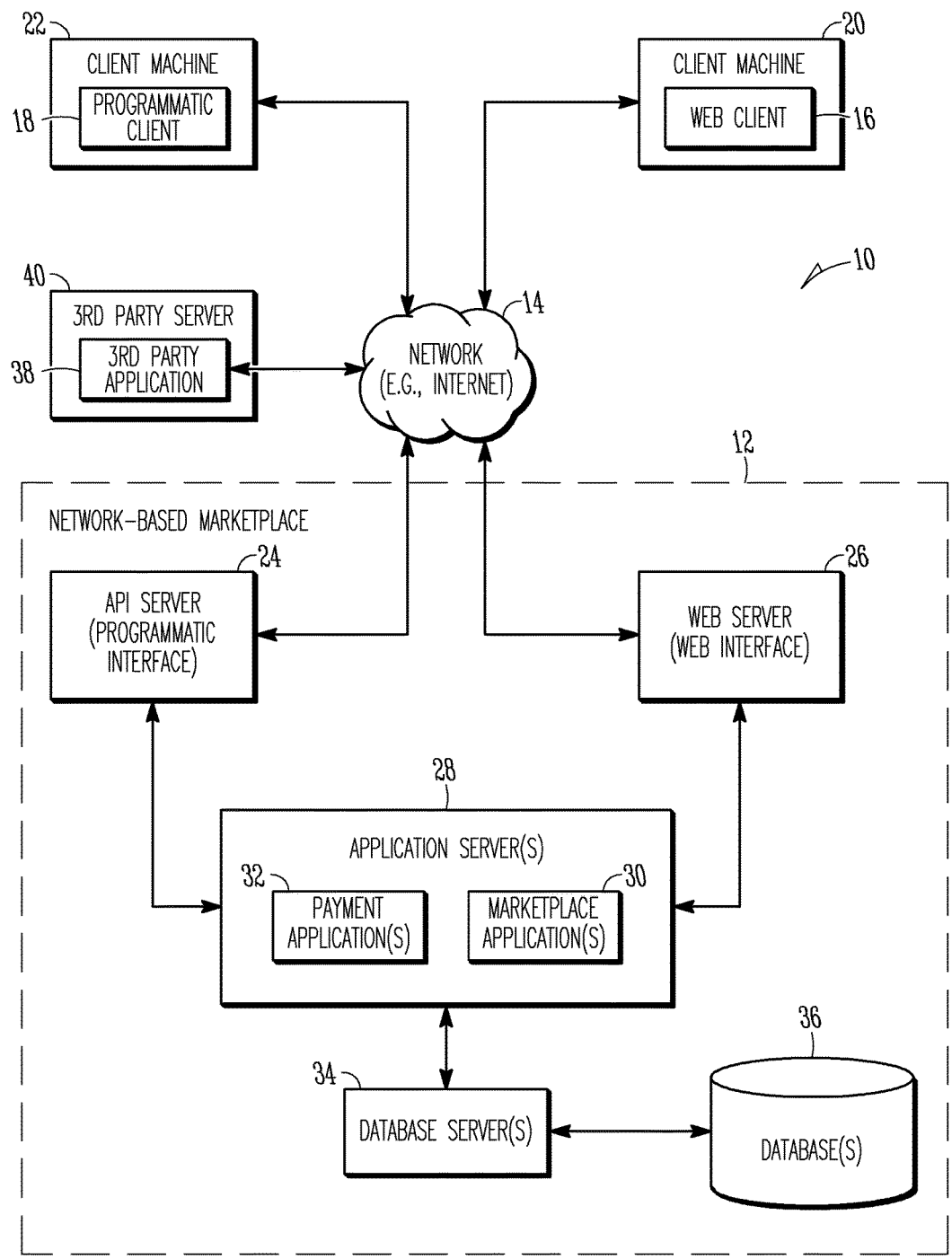
FIG. 1 is a detailed network diagram depicting a system having a client-server architecture, in accordance with one example embodiment.

Methods and systems to transmit data within a distributed computer system are described. In the following description, for purposes of explanation, numerous specific details are set forth in order to provide a thorough understanding of the present invention. It will be evident, however, to one skilled in the art that the example embodiments may be practiced without these specific details.

In one example embodiment, a method and system pre-fetch browser cacheable objects in anticipation of user navigation using available free cycles (e.g., user think time). In an example Web-based system, a pre-fetch system and method may be utilised to optimize a "buying" flow presented by Internet-based commerce web site (e.g., Homepage->Search->View Item->Sign-in-to-bid). An operator of the Internet-based commerce web site may, for example, observe that buyer will typically navigate the pages in the fashion outlined above most of the time. Accordingly, an example method and system may be used to pre-fetch objects present on the Search page when the user visits the Homepage, View Item objects may be pre-fetched on the Search page, Sign-in objects may be pre-fetch on the View Item page and so on. With the pre-fetch of such browser cacheable objects, when the user navigates to the next page in the flow, since cacheable objects have been pre-fetched and is available from the browser cache, the page loads quickly resulting in fast page response times. Also, since the pre-fetch happens asynchronously and after page load there is no performance impact on the currently loading page.

One example embodiment is described in the context of a commerce system; however it will be appreciated that the invention could be implemented in other contexts. Indeed, other example embodiments may be implemented in a wide variety of networking environments in which a data file (or other data structure, such as a JavaScript object from example) requires communication or transmission over a network.

The below described embodiments are directed to methods and systems to transmit data within a network.

In one aspect, a system includes a display module to display first data to a user, the first data being upstream of other data in a data flow; a memory device; and a communication module to receive at least some of the other data before receiving a request from the user to view the other data and to store the received other data in the memory device, wherein after a request is received from the user to display the other data, the display device uses this stored data for the user display.

In another aspect, a system includes a receiving module to receive a request from a user to display first data to the user, the first data being upstream of other data in a data flow; and a transmitting module to transmit the first data to a user device to be viewed by the user and to further transmit, before a request is received from the user to view the other data, at least some of the other data to the user device to be stored in a memory device.

In another aspect, a method of pre-fetching data in a network includes receiving a request from a user to display first data to the user, the first data being upstream of other data in a data flow; transmitting the first data to a user device to be viewed by the user; and transmitting at least some of the other data to the user device to be stored in a memory device before a request is received from the user to view the other data.

In another aspect, a method of pre-fetching data in a network includes displaying first data to a user, the first data being upstream of other data in a data flow; before receiving a request from the user to view the other data, retrieving at least some of the other data; storing the retrieved data in a memory device; and after receiving a request from the user to display the other data, using the stored other data for the display to the user.

Platform Architecture

Figure 2:
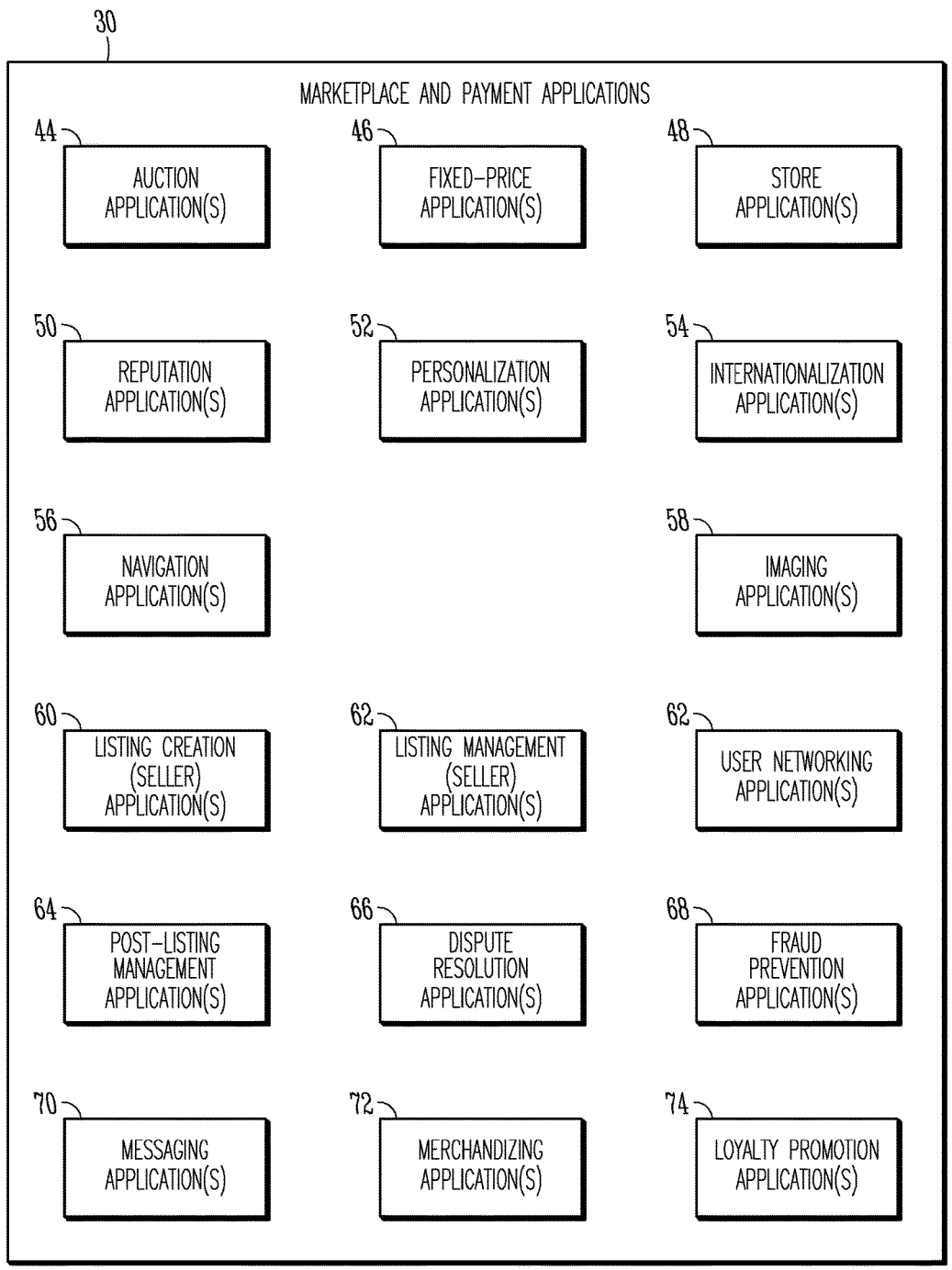
FIG. 2 is a block diagram illustrating multiple commerce system and payment applications, in one example embodiment.

FIG. 1 is a network diagram depicting a system 10, according to one example embodiment, having a client-server architecture. A server platform, in the example form of commerce system 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based commerce system 12, an Application Program Interface (API) server 24 and a web server 26 are coupled to, and provide programmatic and web interfaces respectively to, one or more application servers 28. The application servers 28 host one or more applications (e.g., commerce system applications 30 and payment applications 32.) The application servers 28 are, in turn, shown to be coupled to one or more databases servers 34 that facilitate access to one or more databases 36.

The commerce system applications 30 provide a number of commerce system functions and services to users that access the commerce system 12. The payment applications 32 likewise provide a number of payment services and functions to users. The payment applications 32 may allow users to qualify for, and accumulate, value (e.g., in a commercial currency, such as the U.S. dollar, or a proprietary currency, such as "points") in accounts, and then later to redeem the accumulated value for products (e.g., goods or services) that are made available via the commerce system applications 30. While the commerce system and payment applications 30 and 32 are shown in FIG. 1 to both form part of the network-based commerce system 12, it will be appreciated that, in alternative embodiments of the present invention, the payment applications 32 may form part of a payment service that is separate and distinct from the commerce system 12.

Further, while the system 10 shown in FIG. 1 employs a client-server architecture, embodiments of the present invention are of course not limited to such an architecture, and could equally well find application in a distributed, or peer-to-peer, architecture system. The various commerce system and payment applications 30 and 32 could also be implemented as standalone software programs, which do not necessarily have networking capabilities.

The web client 16, it will be appreciated, accesses the various commerce system and payment applications 30 and 32 via the web interface supported by the web server 26. Similarly, the programmatic client 18 accesses the various services and functions provided by the commerce system and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the commerce system 12 in an off-line manner, and to perform batch-mode communications between the programmatic client 18 and the network-based commerce system 12. Example embodiments may be deployed either within an interface presented by the web client 16, or the programmatic client 18.

FIG. 1 also illustrates a third party application 38, executing on a third party server machine 40, as having programmatic access to the network-based commerce system 12 via the programmatic interface provided by the API server 24. For example, the third party application 38 may, utilizing information retrieved from the network-based commerce system 12, support one or more features or functions on a website hosted by the third party. The third party website may, for example, provide one or more promotional, commerce system or payment functions that are supported by the relevant applications of the network-based commerce system 12.

Commerce System Applications

FIG. 2 is a block diagram illustrating multiple commerce system and payment applications 30 that, in one example embodiment, are provided as part of the network-based commerce system 12. The commerce system 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the commerce system applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based commerce system 12 to establish, build, and maintain reputations, which may be made available and published to potential trading partners. Consider that where, for example, the network-based commerce system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based commerce system 12 over time. Other potential trading partners may then reference such a reputation for the purposes of assessing credibility and trustworthiness.

Personalization applications 52 allow users of the commerce system 12 to personalize various aspects of their interactions with the commerce system 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the commerce system 12 and other parties.

In one embodiment, the network-based commerce system 12 may include a one or more internationalization applications 54 that support a number of marketplaces. Each marketplace may be customized, for example, for specific geographic regions. A version of the commerce system 12 may be customized for the United Kingdom, whereas another version of the commerce system 12 may be customized for the United States. Each of these versions may operate as an independent commerce system, or may be customized (or internationalized) presentations of a common underlying commerce system.

Navigation of the network based-commerce system 12 may be facilitated by one or more navigation applications 56. For example, a search application enables key word searches of listings published via the commerce system 12. A browse application allows users to browse various category, catalogue, or inventory data structures according to which litmus may be classified within the commerce system 12. Various other navigation applications may be provided to supplement the search and browsing applications.

In order to make listings, available via the network-based commerce system 12, as visually informing and attractive as possible, the commerce system applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the commerce system 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. Example embodiments of the present invention may be deployed as part of one or more listing creation applications 60, so as to enable sellers to efficiently upload digital files (e.g., image, video or audio data files) for inclusion within listing information published by the commerce system 12.

One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Data Structures

Figure 3:
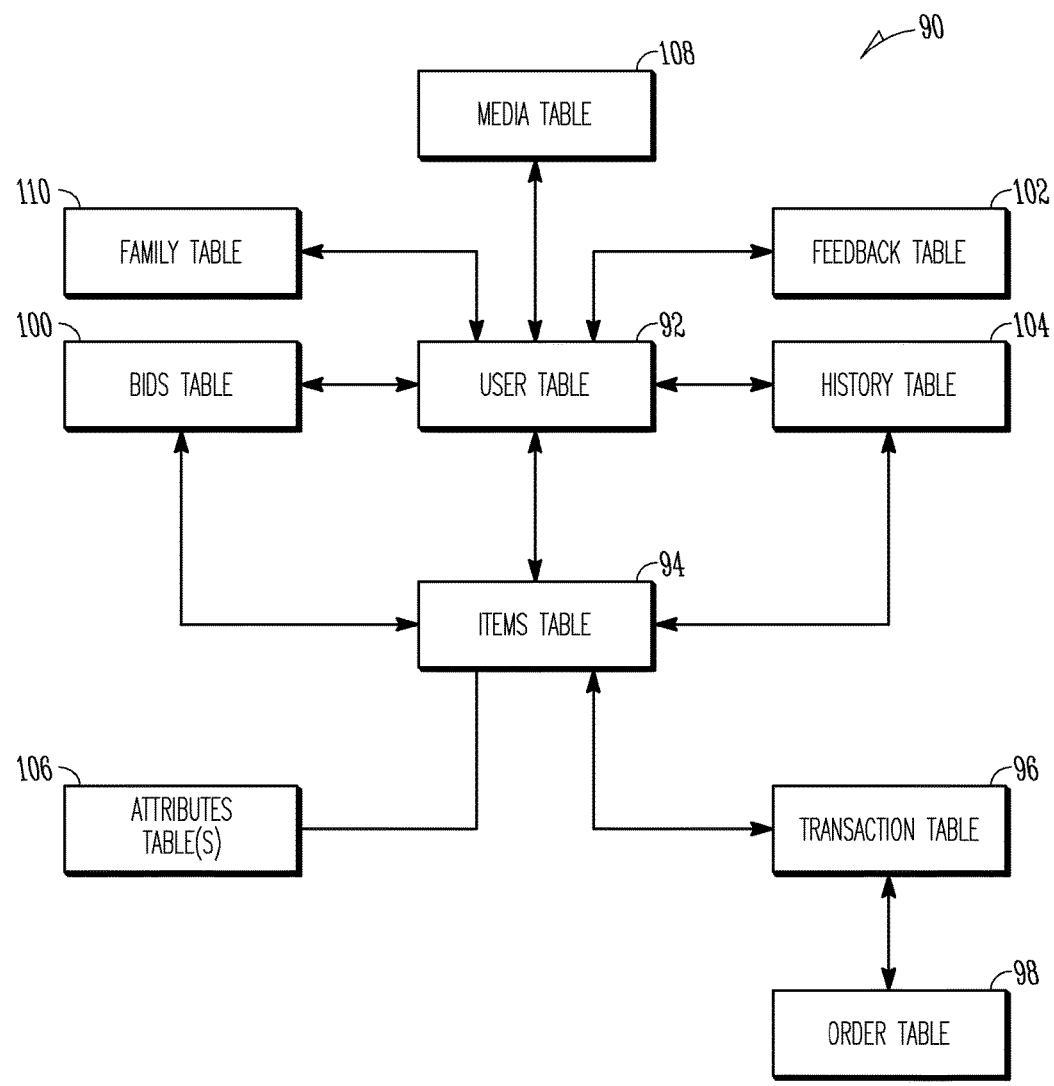
FIG. 3 is a high-level entity-relationship diagram, in accordance with an example embodiment.

FIG. 3 is a high-level entity-relationship diagram, illustrating various tables 90 that may be maintained within the databases 36, and that are utilized by and support the commerce system and payment applications 30 and 32. A user table 92 contains a record for each registered user of the network-based commerce system 12, and may include identifier, address and financial instrument information pertaining to each such registered user. A user may, it will be appreciated, operate as a seller, a buyer, or both, within the network-based commerce system 12. In one example embodiment, a buyer may be a user that has accumulated value (e.g., commercial or proprietary currency), and is then able to exchange the accumulated value for items that are offered for sale by the network-based commerce system 12.

The tables 90 also include an items table 94 in which are maintained item records for goods and services that are available to be, or have been, transacted via the commerce system 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based commerce system 12 in connection with an auction-format listing supported by an auction application 44. A feedback table 102 is utilized by one or more reputation applications 50, in one example embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

The tables 90 also include a media table 108 to store digital media files associated with item information maintained within items table 94. Specifically, the digital media files may comprise image, video or audio files that are included within, or accessible via, a listing to provide further information pertinent to a particular listing. It will be appreciated that, relative to text information that may be included within the items table 94, the digital media files within the media table 108 may be relatively large and accordingly require additional time and resources to upload to the commerce system 12 from a programmatic client 18 or a web client 16.

Figure 4:
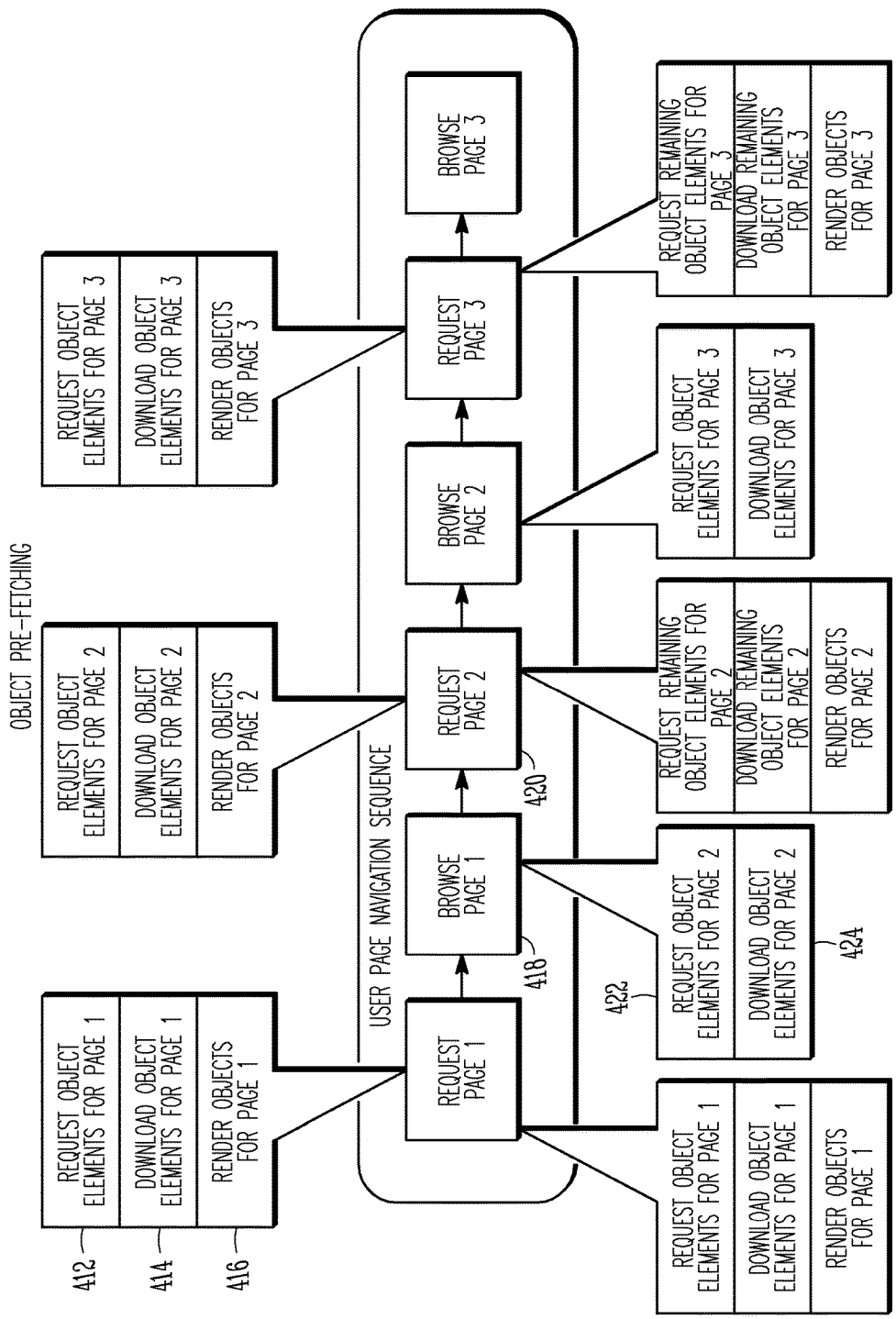
FIG. 4 is an example method of pre-fetching data in a network.
Figure 5:
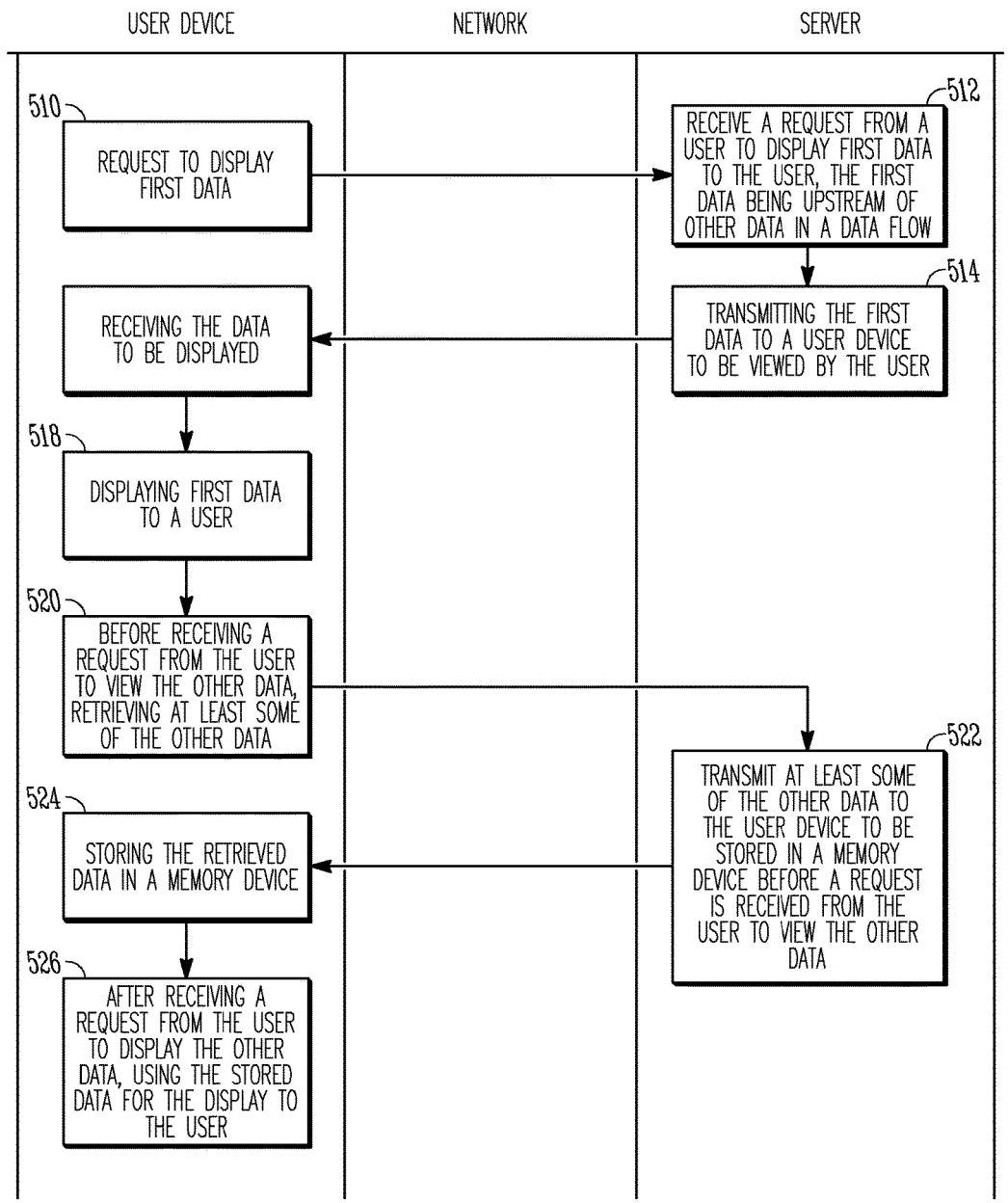
FIG. 5 is an example method of pre-fetching data in a network.

Referring to FIGS. 4 and 5, for a seller to list an offering for sale or auction on the network based commerce system 12, the seller will typically access the commerce system 12 using a programmatic client 18 or web client 16.

The clients 18 and 16 are accessed by the user via a graphical user interface of a user's computer, for example, and these prompt a user to enter information into a plurality of fields displayed on the graphical user interface.

The user will typically navigate through various graphical user interfaces where data is displayed to the user, and wherein each graphical user interface will typically include at least one link to other data or a plurality of links to other data.

For example, where the user accesses a web page via the Internet, the web page is displayed to the user with a plurality of links to other web pages.

The seller then inputs information using a user input device which is received by the programmatic client 18 or the web client 16 and then transmitted over the network 14 to the commerce system 12.

The information which the seller will want to input will typically be information including the user's identification (otherwise referred to as the seller's identification) and information relating to offering identification, typically with price information.

A sequence, series or a set of web pages that are presented to a user when navigating a web site may be referred to as a "flow" or a "page flow". The flow of web pages may be determined or specified in a number of ways. For example, a flow of web pages may be defined by links embedded into the relevant web pages that link the relevant pages into a flow.

In one example, the page flow captures the sequence of pages URL's that the user will visit during the course of their site navigation. A typical buyer on an e-commerce site, for example, would visit the homepage, search for an item by typing a search term or clicking on a category which takes the user to the item listings page (also referred to as a search page). The user would then click on an item from the list and be taken to a View Item page. If interested in the item, the user will initiate bidding which will require a sign in. The user is taken to the sign in page and subsequently to the bidding page. In this example, the flow captures the natural sequence of operations or pages that the user would follow to perform his operation.

However, a flow may also be determined by any combination of inputs provided into a particular web page. For example, in a sequence, a next web page to be presented to a user may be determined based on input (e.g., data) provided via a current web page to an underlying Web application. Consider that particular choices or input provide on one page may be utilized by a web site to identify a subsequent web page to be communicated and displayed to a user. User provided data may be communicated to web site (e.g., via a POST operation) when a user selects a SUBMIT button presented on a current web page. In this scenario, it will be appreciated that the SUBMIT button does not link to a particular subsequent web page, but merely initiates a posting of the data entered by the user into the current web page to the web site.

A page flow may for example be a directory of Web application files that work together to implement a user interface (UI) feature. For example, a page flow may also implement a Web application's user registration wizard feature. One example of a page flow is a Java Page Flow (JPF), which is a group of pages (e.g., JavaServer Pages—JSPs) and an annotated Java "controller" class that defines the flow of an application. In addition to allowing complex logic to dictate which pages are displayed, JPF technology helps decouple page authoring from application logic by preventing one page from directly referencing another. JPF technology also allows for state management, and reuse of entire flows within other flows. Page Flows assists in building Java web applications. When programming with Page Flows, the developer writes Java classes and pages, and there is very little occasion to work with configuration files, or other components. Page Flow programming also assists in separating presentation logic from data processing logic. Data processing and the web application configurables are handled in a single Java class using a simple declarative programming model.

Many common web application programming tasks are accomplished through a declarative programming model using, for example JSR 175 metadata annotations. JSR 175 metadata annotations, "annotations" for short, are property setters for Java classes and methods, alleviating the need for independent configuration files. Navigation, exception handling, validation, and other tasks become configurable properties of a single Java class, the "controller" class that drives the web application.

Continuing the discussion of the example JPF technology, when a user enters a Page Flow (e.g., by calling an URL in the Page Flow's URL space), an instance of the Page Flow's controller class may be created. While the user is in the Page Flow, the controller class stores the accumulated flow-related state in member variables of the controller class. The methods within the class have access to the accumulated state, thus facilitating state management within the web application. For example, if a web application calls for a multi-page registration, where the user moves from page to page filling out a user profile. The controller class stores the user data as the user progresses through the registration and has access to the profile data as session state. When the user leaves the Page Flow, the state is automatically cleaned up.

Page flows implemented utilizing JPF technology may also be modular. For example, a single web application can have multiple Page Flows within it, allowing a programmer to break up the application into separate, self-contained chunks of functionality. Page Flow web applications also contain a global Page Flow, called the "shared flow", which is both a fallback handler for unhandled actions and exceptions and a place to store session state. An instance of the shared flow class is stored in the user session upon the first request to any Page Flow and remains until the session ends. When an action is raised in a Page Flow, and that action is not handled by the Page Flow, the shared flow gets a chance to handle it. The same is true for an exception raised within a Page Flow: if it is unhandled in the Page Flow, the shared flow gets a chance to handle it.

Page flows implemented utilizing JPF technology may also be nestable. Page flow nesting provides a programmer with an ability to break up a project into separate, self-contained bits of functionality. Nesting may be regarded as a way of pushing aside the current page flow temporarily and transferring control to another (nested) page flow with the intention of coming back to the original (nesting) one.

Returning to the general discussion regarding page flows, where the seller is presented a sequence of web pages (e.g., a page flow), it may take some time for all the data in a subsequent web page to be transmitted over the network to the user's device.

To address this, at least some of the data from downstream web pages in a page flow is downloaded and cached in a memory device, typically a memory device of the user device, before a request is received from the user to view the linked web page. Thus, the data is being downloaded while the user is browsing the web page currently displayed on their graphical user interface.

It will be appreciated that static objects are browser cacheable while dynamic objects are objects whose contents needs to be composed every time and are therefore not cacheable. For HTTP requests these will be marked with suitable no-cache header directives.

In one embodiment, the downloaded data may comprise a cacheable object such as a JavaScript object Images, CSS (style sheets) or Flash objects to name a few examples. These are in general static objects.

In one embodiment, the downloaded data (e.g., object, program or script) is not executed or displayed to the user before the user is presented with the relevant downstream web page, even though the download of the data may be complete, as this would disrupt the display that is currently being displayed to the user.

As a regular script included in the download would cause the browser to download the JavaScript object and execute it, to circumvent this, the object type is defined as some custom type e.g. text/x-ebayScript. Since the browser does not recognize this type, it downloads it but does not execute it.

For example:
A typical script may be: <script type="text/javascript" A custom script may be: <script id="jsLoader" type="text/x-ebayScript"></script>

Furthermore, the downloaded data is only downloaded after the completion of the download of the first requested data download so as not to interfere with or slow down the download of the first requested data.

The length of time that the downloaded data is cached for is determined in one example by the individual object's expiry settings which determines the time it will live in the browser cache. Thus the browser cache is not modified in this regard.

Once the user is presented with the relevant downstream web page (e.g., a page flow reaches the downstream web page, or a user selects the linked web page for viewing), the data cached in the memory device is used to display the downstream web page to the user.

It will be appreciated that a web page may have a large number of potential downstream web pages (e.g., may include links to a number of other web pages, or may be associated with a number of other web pages by a defined page flow). In this case, it may not be practical to download and cache all of the data from all of these downstream web pages. Therefore different approaches may be used.

For example, some of the data may be downloaded and cached from each of these downstream web pages.

Alternatively, information may be stored to determine which of these downstream web pages are most frequently viewed and some or all of the data may be downloaded and cached from only one or some of the most frequently viewed downstream web pages.

Thus, in one example implementation the objects being pre-fetched on every page have been predetermined and coded into the page. In this example, the pre-fetch logic is static.

In another example implementation, the pre-fetch logic could also be made dynamic in which case a mechanism to store the list of objects that should be pre-fetched whenever the user navigates to a page is implemented. This could involve computing what page the user will likely visit next and determine the objects on this next page that can be pre-fetched. This information could be stored in the server and be sent to the browser as part of the current page. Whenever a user requests a page, they will get the requested page which will also include the code snippet to pre-fetch objects from the logical next page. So when the browser downloads the page and the objects contained within, it will also trigger the snippet that pre-fetches objects.

If only some of the data is downloaded and cached from a particular downstream web page, and the user then requests that downstream web page to be viewed, the rest of the data (e.g., objects, programs, scripts and display data) required by the downstream web page to the user is only downloaded after the request and used in conjunction with the pre cached data to display the web page to the user.

This is accomplished by the browser which is aware of the contents of its cache. The browser, when it requests a page and all its embedded objects, first checks its cache and when it finds the object there (and if its still within the expiry limit) it does not make a network call to fetch it again.

In one example embodiment, a server implements the method described above by, after receiving a request from a user to display a first web page to the user, transmitting web page data to the user device to be viewed by the user. The server then transmits data included in the at least one other downstream web page to the user device to be stored in a memory device before a request is received from the user to view the at least one other web page.

Referring to FIG. 4, the top of the Figure shows a first methodology used and the bottom of the Figure shows an embodiment of a method to pre cache data.

In the first method, a user requests a web page to be displayed via a graphical user interface. The web browser of the user requests the data for the page (operation 412), receives the downloaded data (operation 414) and displays the requested web page to the user (operation 416) on the graphical user interface.

The process now halts while the user browses the web page (operation 418) until the user requests a further web page (operation 420) and so the process continues.

In the example embodiment, while the user is browsing the downloaded page (operation 418), a request is transmitted to download some data for a downstream web page (operation 422). The data is then downloaded (operation 424) during the time that the user is browsing the first downloaded web page (operation 418). The process then continues in this described manner.

It will be appreciated that the process of downloading pre cacheable data before the user has requested the data can be repeated a number of times.

An example of the method is further illustrated in FIG. 5 showing the operations performed by a user device and the operations performed by a server side device.

On the user side, a request to display first data (operation 510) is generated. The requested is received (operation 512) by the server to display the first data to the user, or executed or otherwise processed on a machine of the user. The first data (e.g., web page, objects, program, scripts) may be part of a flow (e.g., a page flow) that includes other data (e.g., the first data may contain a link to other data).

The first data is transmitted (operation 514) to a user device to be processed (e.g., to generated a user interface to be viewed by the user) and this first data is received (operation 516) and processed (e.g., displayed (operation 518) to the user).

Before processing the other data (e.g., responsive receiving a request from the user to view the other data), at least some of the other data is retrieved (operation 520) and is transmitted (operation 522) to the user device.

This other data is stored (operation 524) in a memory device and only after a request has been received (operation 526) from the user to process the other data, is the stored other data processed (e.g., used for the display to the user).

As the example embodiment is within the context of an electronic commerce system, the web pages requested will typically detail an online listing whether it is a seller inputting the listing or a buyer viewing the listing for a possible purchase.

Figure 6:
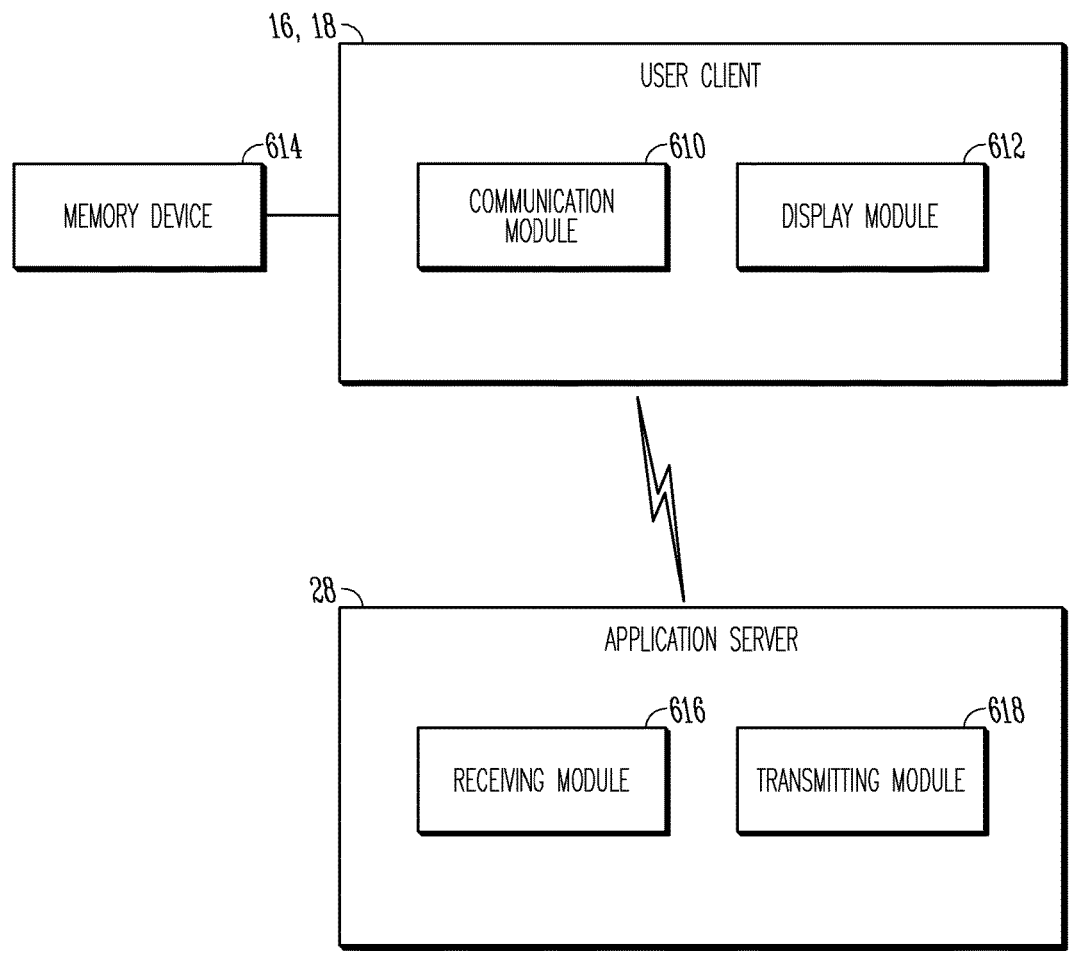
FIG. 6 shows an example system to implement the above method.

An example system to implement the abovementioned method is shown in FIG. 6 and includes a communication module 610 to communicate with an application server 28.

The system further includes a display module 612 to control the display of data to a user via a display device (not shown).

A memory device 614 is associated with the communication module 610 and the display module 612 and is used to store the pre cached data as has been described above.

An application server 28 includes a receiving module 616 to receive a request from a user to display the first data to the user and a transmitting module 618 to transmit data to the user device to be viewed by the user and to further transmit other data to the user device to be stored in the memory device 614 as has been described above.

Figure 7:
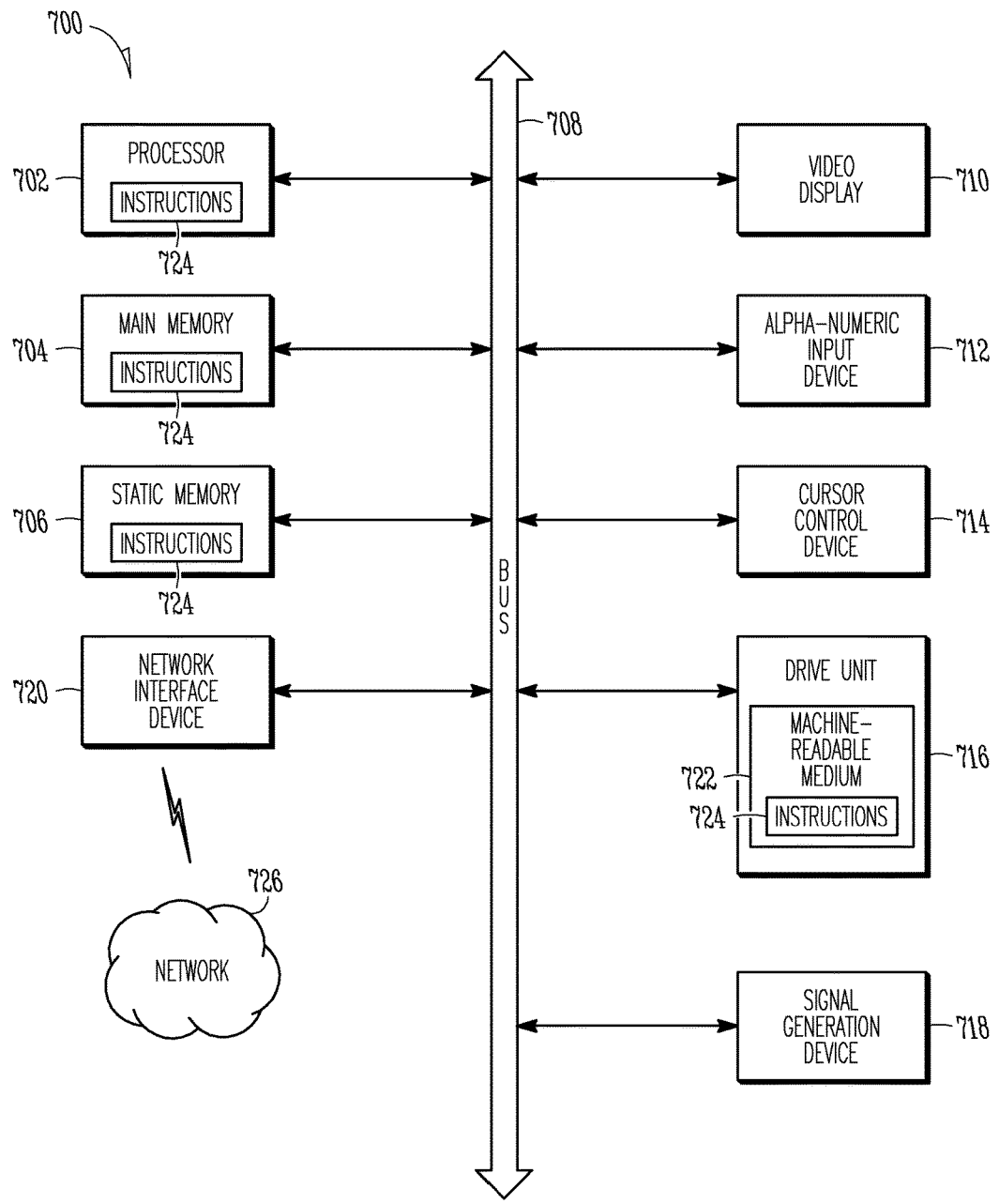
FIG. 7 shows a diagrammatic representation of a machine in the example form of a computer system within which instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

A disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories and optical and magnetic media.

Although the present embodiments has been described with reference to specific example embodiments, it will be evident that various modifications and changes may be made to these embodiments without departing from the broader spirit and scope of the invention. For example, the various modules described herein may be preformed and created using hardware circuitry (e.g., CMOS based logic circuitry) as well as in software.

For example, the modules referred to above may be embodied using transistors, logic gates, and electrical circuits (e.g., application specific integrated ASIC circuitry). In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

In one example, the system is implemented using a machine readable machine having instructions that, when executed by a machine, cause the machine to perform the method described herein.

One example embodiment uses JavaScript to do the pre caching downloads. Embodiments may also be implemented using other technologies like Java applets, ActiveX etc.

The following example code provides a sample implementation of a download process.

```
<script type="text/javascript">
/*
```

This function makes a call to retrieve the SCRIPT element from the DOM and then sets SRC of that element to the remote path of the javascript resource, initiating the download.

```
*/
    function pre-fetch( )
    {
        if(document.getElementById)
        {
            var linkObj = document.getElementById("jsLoader");
            linkObj.src="path_to_object_to_be_pre-fetched.js"
        }
        else
        {
            return;
        }
    }
```

-continued

```
/*

This code sets the ONLOAD function handler to call the
PRE-FETCH( ) function.

*/
        window.onload = function( )
        {
            if(typeof(pre-fetch)!="undefined")
                setTimeout("pre-fetch( )",2000);
        }
    </script>
    /*

SCRIPT element whose SRC is set to the path of the
pre-fetched object. Type attribute is set to a bogus type to
circumvent execution.

*/
    <script id="jsLoader" type="text/x-ebayScript"></script>
```

What is claimed is:

1. A computer-implemented method of pre-fetching data in a network, comprising:
   receiving a first request from a user device to display a first web page to a user, the first web page being upstream from and different from a next web page in a page flow, the first web page associated with first data for displaying the first web page;
   transmitting the first data to the user device, the first data including a code snippet that pre-fetches other data associated with the next page, the code snippet triggerable to pre-fetch the other data upon downloading the first web page by a web browser on the user device, the other data representing at least some data used for displaying the next web page in the page flow, the other data identified based on at least one of a frequently viewed next web page in the page flow;
   responsive to downloading the first web page by the web browser on the user device, receiving a request from the user device to retrieve the other data;
   retrieving, using a processor of a machine, the other data;
   transmitting the other data to the user device for storage in a web browser cache at the user device before receiving a second request from the user device to display the next web page;
   responsive to the web browser on the user device determining that not all data for displaying the next web page is stored in the web browser cache, which includes the user device checking the web browser cache for stored objects within an expiry limit, receiving, while the first web page is displayed at the user device, the second request from the web browser on the user device to display the next web page to the user, the second request identifying remaining data not stored in the web browser cache for displaying the next web page; and
   transmitting the remaining data to the user device in response to receiving the second request identifying the remaining data for displaying the next web page.

2. The computer-implemented method of claim 1, wherein the other data includes at least one JavaScript object; wherein transmitting the other data to the user device before receiving the second request from the user device to display the next web page further comprises: transmitting the at least one JavaScript object in a non-executable format for storage in the user device, the non-executable format defined by an object type of the at least one JavaScript object as a custom object.

3. The computer-implemented method of claim 1, wherein the first data includes one or more web pages, objects, programs, scripts, or web page links, and wherein the other data includes one or more web pages, objects, programs, scripts, or web page links.

4. The computer-implemented method of claim 3, wherein transmitting the other data to the user device before receiving the second request from the user device to display the next web page further comprises:
   retrieving a list of objects.

5. The computer-implemented method of claim 1, wherein the other data includes at least one static object.

6. The computer-implemented method of claim 1, wherein the page flow includes a sequence of pages for performing an operation.

7. The computer-implemented method of claim 1, wherein transmitting the other data to the user device before receiving the second request from the user device to display the next web page further comprises:
   transmitting, while the user device is displaying the first web page, the other data to the user device.

8. The computer-implemented method of claim 1, further comprising:
   determining the next web page in the page flow based on links embedded in the first web page and user input related to any combination of data input provided by the user on the first web pages provided by one or more users.

9. A system to pre-fetch data in a network, comprising:
   a memory device for storing instructions; and
   a processor, which, in response to executing the instructions, causes the system to:
      receive a first request from a user device to display a first web page to a user, the first web page being upstream from and different from a next web page in a page flow, the first web page associated with first data for displaying the first web page;
      transmit the first data to the user device, the first data including a code snippet that pre-fetches other data associated with the next page, the code snippet triggerable to pre-fetch the other data upon downloading the first web page by a web browser on the user device, the other data representing at least some data used for displaying the next web page in the page flow, the other data identified based on at least one of a frequently viewed next web page in the page flow;
      responsive to downloading the first web page by the web browser on the user device, receiving a request from the user device to retrieve the other data;
      retrieve the other data;
      transmit the other data to the user device for storage in a web browser cache at the user device before receiving a second request from the user device to display the next web page;
      responsive to the web browser on the user device determining not all data for displaying the next web page is stored in the web browser cache, which includes the user device checking the web browser cache for stored objects within an expiry limit, receive, while the first web page is displayed at the user device, the second request from the web browser on the user device to display the next web page to the user, the second request identifying remaining data not stored in the web browser cache for displaying the next web page; and transmit the remaining data to the user device in response to receiving the second request identifying the remaining data for displaying the next web page.

10. The system of claim 9, wherein the first data includes one or more web pages, objects, programs, scripts, or web page links, and wherein the other data includes one or more web pages, objects, programs, scripts, or web page links.

11. The system of claim 9, wherein the other data includes at least one static objects.

12. A computer readable non-transitory storage medium having stored thereon instructions that when executed by at least one processor of a machine, cause the machine to perform operations comprising:

receiving a first request from a user device to display a first web page to a user, the first web page being upstream from and different from a next web page in a page flow, the first web page associated with first data for displaying the first web page;

transmitting the first data to the user device, the first data including a code snippet that pre-fetches other data associated with the next page, the code snippet triggerable to pre-fetch the other data upon downloading the first web page by a web browser on the user device, the other data representing at least some data used for displaying the next web page in the page flow, the other data identified based on at least one of a frequently viewed next web page in the page flow;

responsive to downloading the first web page by the web browser on the user device, receiving a request from the user device to retrieve the other data;

retrieving the other data;

transmitting the other data to the user device for storage in a web browser cache at the user device before receiving a second request from the user device to display the next web page;

responsive to the web browser on the user device determining not all data for displaying the next web page is stored in the web browser cache, which includes the user device checking the web browser cache for stored objects within an expiry limit, receiving, while the first web page is displayed at the user device, the second request from the web browser on the user device to display the next web page to the user, the second request identifying remaining data not stored in the web browser cache for displaying the next web page; and transmitting the remaining data to the user device in response to receiving the second request identifying the remaining data for displaying the next web page.

* * * * *